Oct. 17, 1950     C. L. WEAVER     2,525,844
PARACHUTE FOR AERODYNAMIC BRAKING OF AIRPLANES
Original Filed Aug. 14, 1945     4 Sheets-Sheet 1
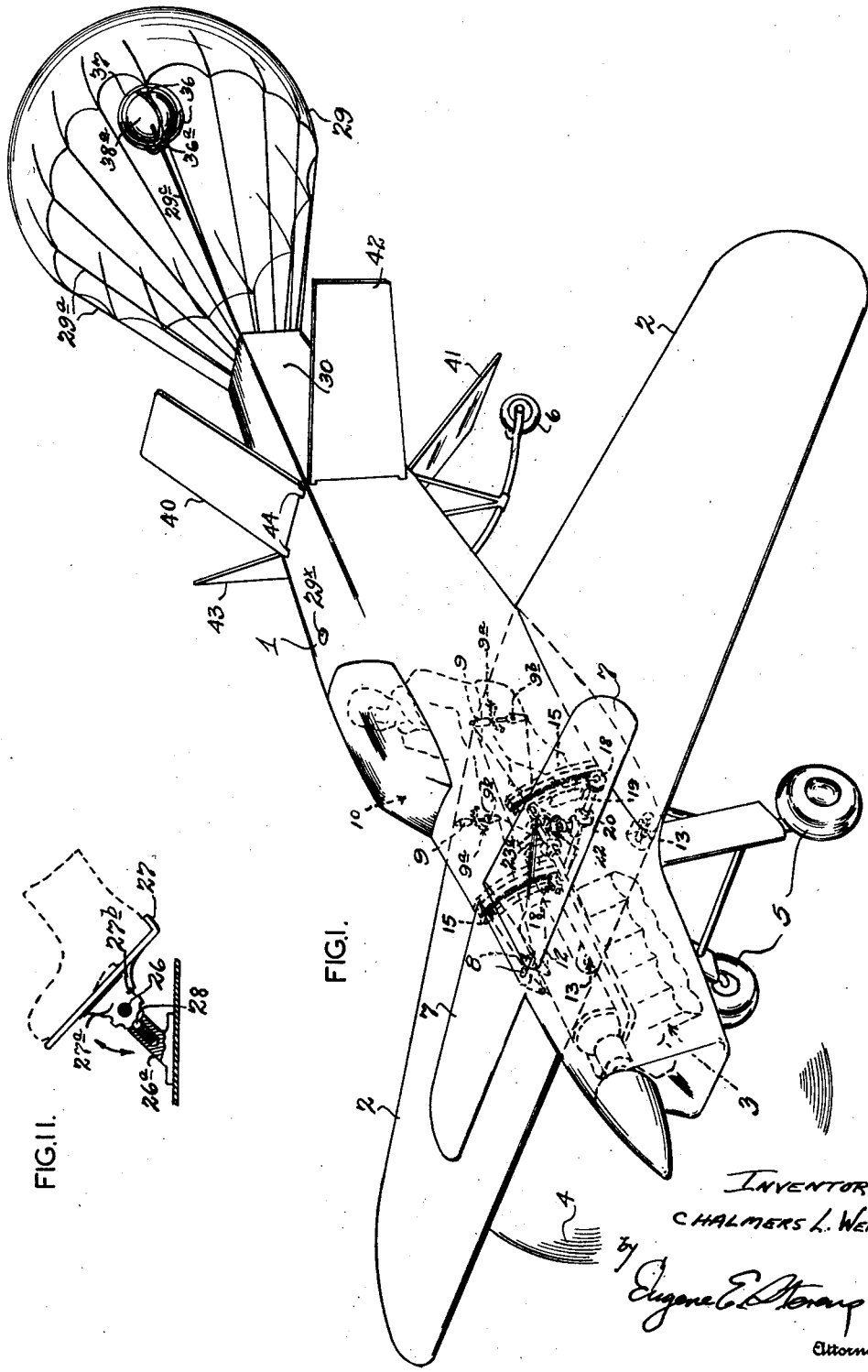
INVENTOR:-
CHALMERS L. WEAVER
By Eugene E. Stevens
Attorney Oct. 17, 1950      C. L. WEAVER      2,525,844
PARACHUTE FOR AERODYNAMIC BRAKING OF AIRPLANES
Original Filed Aug. 14, 1945      4 Sheets-Sheet 2
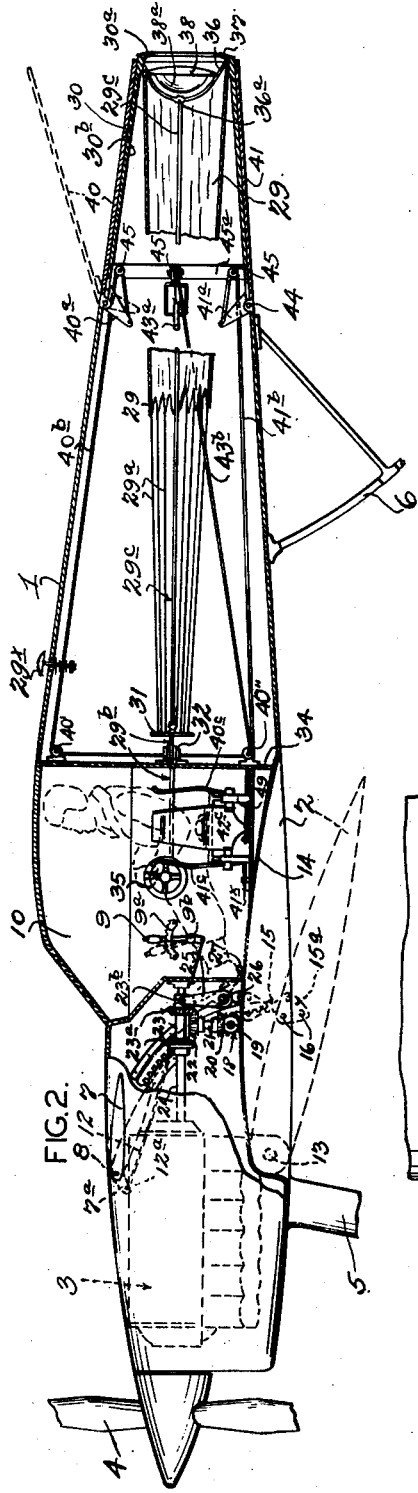
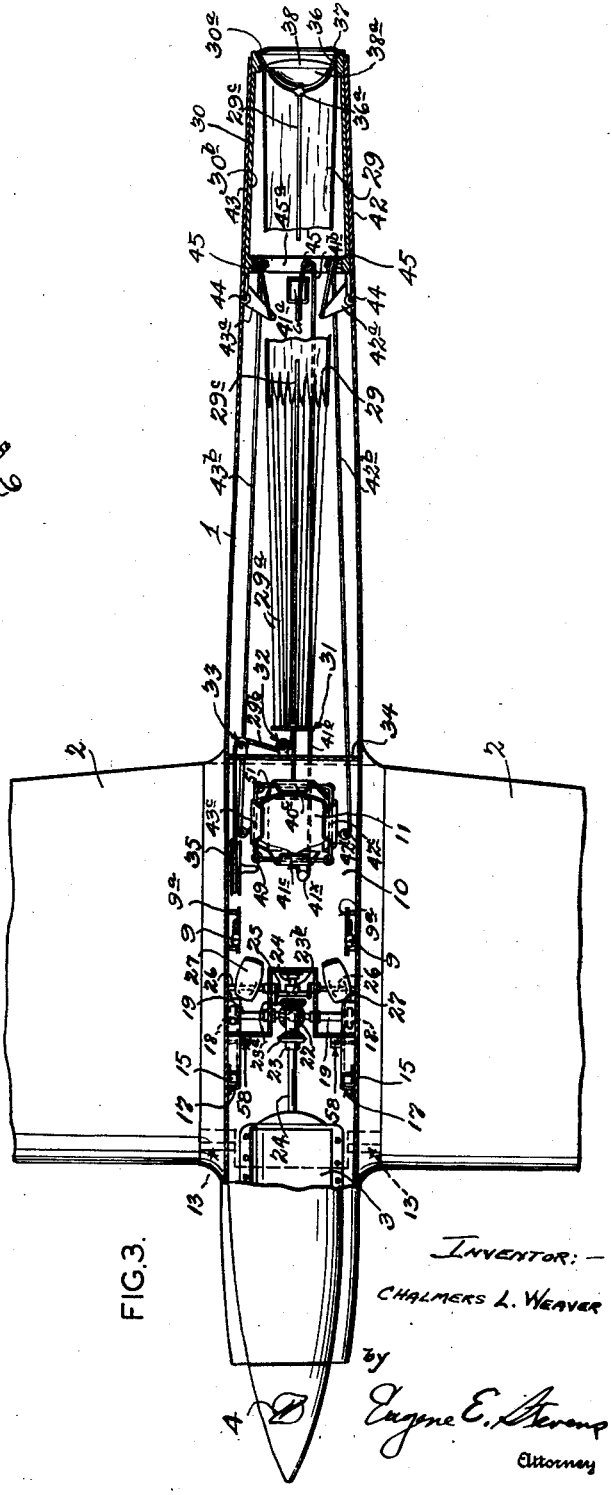
INVENTOR:—
CHALMERS L. WEAVER
by
Eugene E. Stevens
Attorney Oct. 17, 1950　　　　　　　C. L. WEAVER　　　　　　　2,525,844
PARACHUTE FOR AERODYNAMIC BRAKING OF AIRPLANES
Original Filed Aug. 14, 1945　　　　　　　　　　　　　4 Sheets-Sheet 3
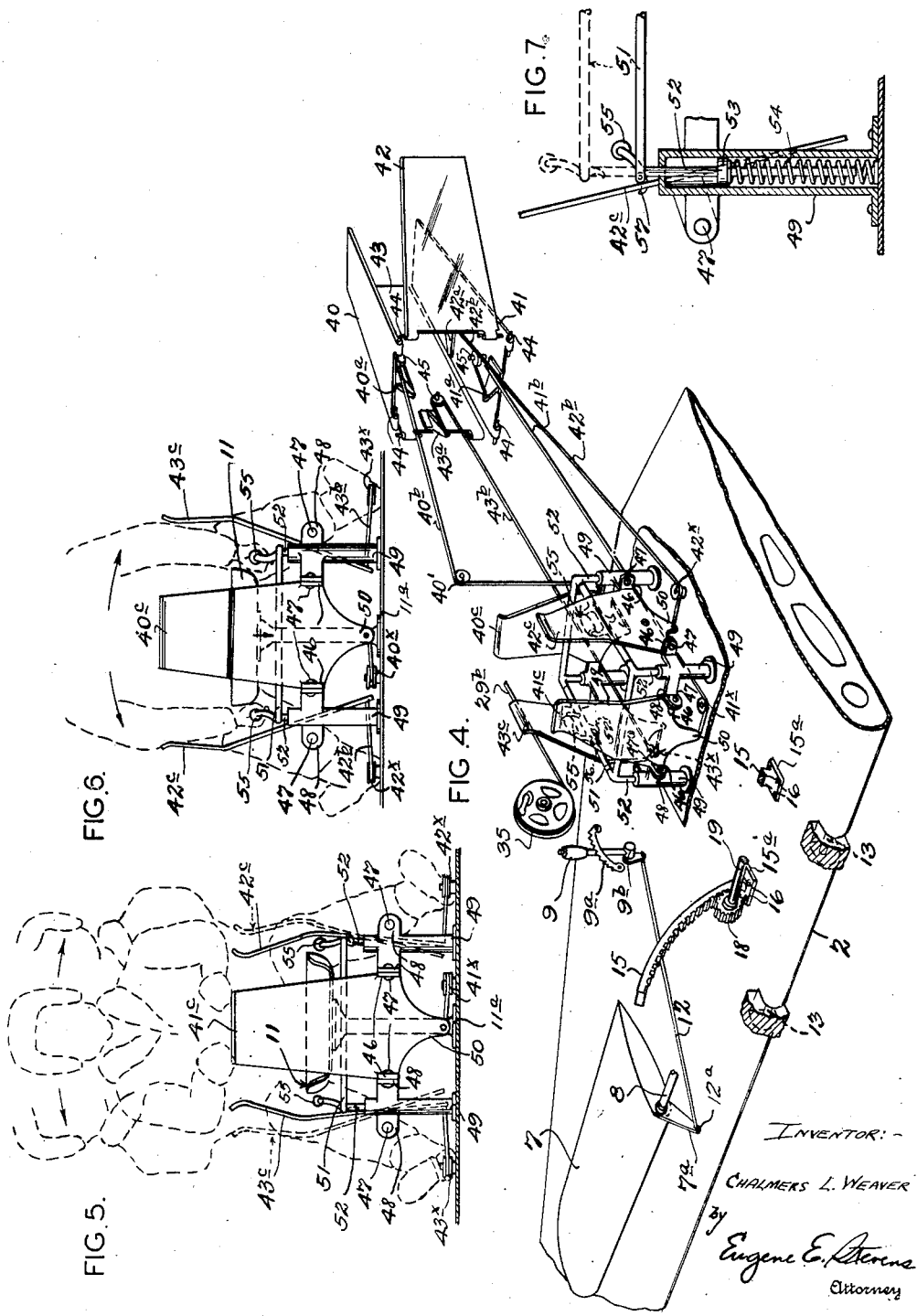

Oct. 17, 1950     C. L. WEAVER     2,525,844
PARACHUTE FOR AERODYNAMIC BRAKING OF AIRPLANES
Original Filed Aug. 14, 1945     4 Sheets-Sheet 4
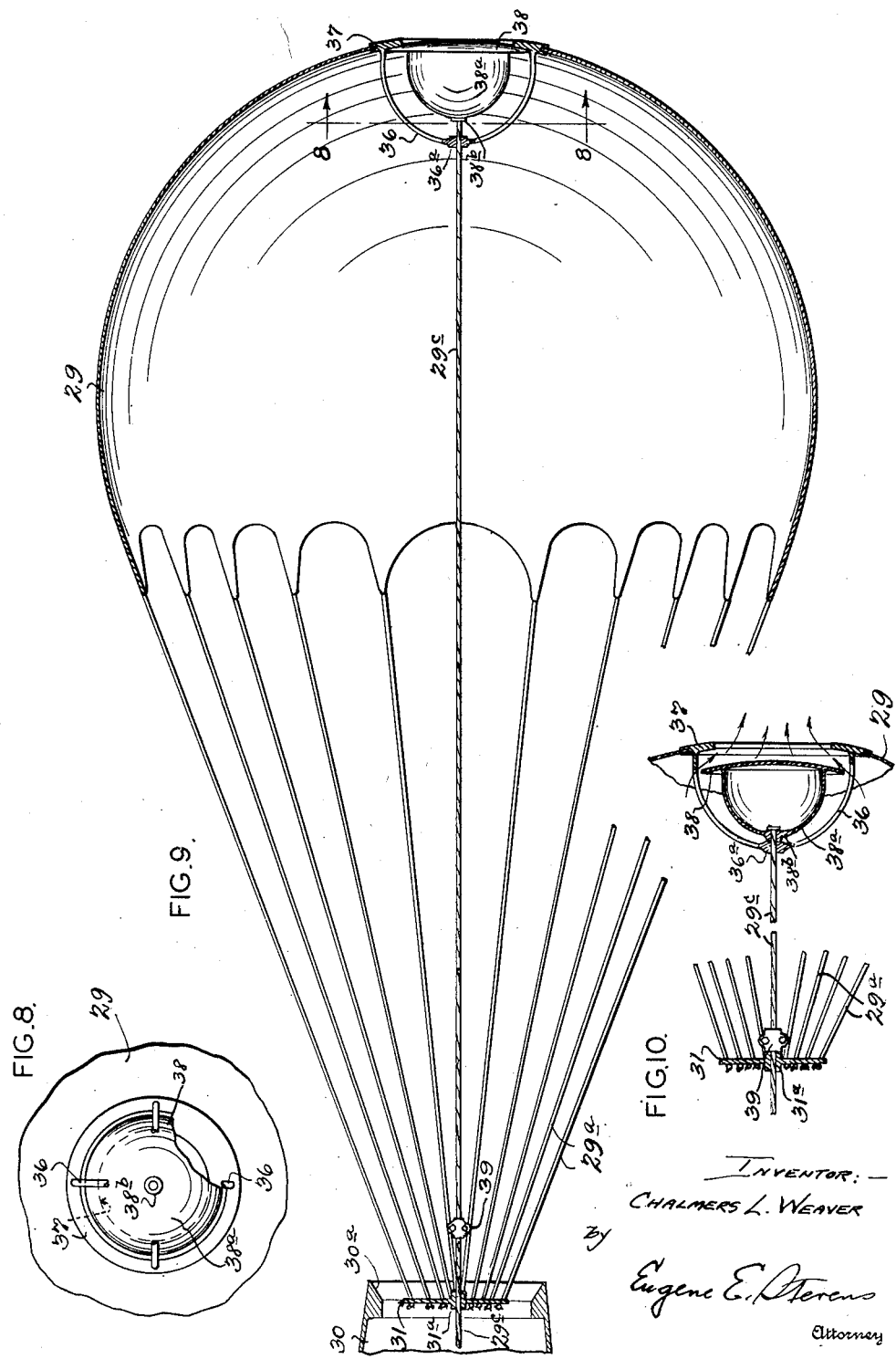
INVENTOR:—
CHALMERS L. WEAVER
By Eugene E. Stevens
Attorney Patented Oct. 17, 1950

2,525,844

UNITED STATES PATENT OFFICE 2,525,844

PARACHUTE FOR AERODYNAMIC BRAKING OF AIRPLANES

Chalmers Lamar Weaver, St. Louis, Mo.

Original application August 14, 1945, Serial No. 610,715. Divided and this application March 18, 1947, Serial No. 735,295

9 Claims. (Cl. 244—113)

My invention relates to improvements in parachute for aerodynamic braking of airplane and is applicable to both those of the powered and glider variety, being a division of my application Ser. No. 610,715, filed August 14, 1945, which is an improvement over the disclosure of my Patent No. 1,544,787, dated July 7, 1925.

Briefly and generally stated, the invention has among its primary objects, the provision of novel steering and braking means for airplanes, same being of comparatively simple construction, readily operable and the braking means enabling the pilot to bring the plane to a stop within a short distance after landing.

More specifically, it is an object of the invention to provide in an airplane, a forwardly located laterally extending sustaining wings which are horizontally swingable for braking purposes; and in combination with these, a tail-carried parachute which is adapted to be stored in the rear end of the fuselage and is projectable outwardly to provide braking means at the rear end of the fuselage. The movement of the wings for braking purposes is adapted also to counteract any tendency of the braking parachute when in operation to substantially throw the fuselage of the ship out of flight in a horizontal plane.

Still another object of the invention is to provide an airplane, as characterized in the foregoing paragraph, and which embodies braking means intermediate the wings and tail terminal of the fuselage which latter braking means includes elements independently operable to guide the ship in normal flight, and also when the sustaining wings and parachute are operated for braking purposes, thus giving the pilot flight direction control of the plane at all times.

Another object of the invention is to provide in an airplane a novel tail construction embodying outwardly swingable right-angularly disposed wall panels which are not only independently operable for steering the plane but which may also be simultaneously operated for braking purposes.

Additionally, the invention aims to provide a steering and braking wall panel incorporating fuselage tail for an airplane wherein the operation of the panels may be and preferably is accomplished by body movement of the pilot in his seat. It should also be noted, as will be more apparent hereinafter, that the tail-carried panels mentioned enable the pilot to quickly shift the line of flight of the airplane in vertical or horizontal directions to keep the parachute "filled," as for instance when the parachute is partially closed by a cross current of air.

A further object of the invention resides in the provision of a novel braking parachute means which is adapted to be normally housed in a novel steering and braking panel incorporating fuselage tail, there being pilot-operated means for effecting release of said braking parachute to operative position when the plane is in flight.

The invention also contemplates a novel main wing structure and means for mounting the same for movement about a horizontal axis whereby said main wings may be operated for braking purposes, not only while the plane is in flight, but also after it has landed; said main wings also being operable to counteract the tendency of a braking parachute extending from the tail of the fuselage to nose the plane toward the ground.

The invention also resides in certain novel features of construction, combination and arrangement of the various parts and in modes and methods of operation, all of which will become apparent to those skilled in the art from a study of the following detailed description of the now preferred embodiment which is illustrated in the accompanying drawings, in which:

Fig. 1 is a perspective view of an airplane in flight and illustrating the braking parachute in operative position and likewise the steering panels thrown outwardly;

Fig. 2 is a side elevational view partly in longitudinal section of an airplane embodying my invention;

Fig. 3 is a fragmentary plan view, partly in horizontal section;

Fig. 4 is a fragmentary perspective view illustrating the steering panels and the control means therefor, the view also illustrating a portion of the main wing operating means and one of the ailerons;

Fig. 5 is a front elevational view of the pilot's seat and associated body operated means for controlling the steering panels of the tail;

Fig. 6 is a rear elevational view of the pilot's seat and associated panel controlling means and illustrates particularly the means for simultaneous control of the steering panels;

Fig. 7 is a detailed view in vertical section of one of the supporting posts which are incorporated in the means for simultaneously operating the steering panels;

Fig. 8 is a detailed view in rear elevation of a valve which is incorporated in the braking parachute, the view having been taken on the line 8—8 of Fig. 9;

Fig. 9 is a longitudinal sectional view through the braking parachute in its operative position and showing a portion of the parachute housing tail of the plane;

Fig. 10 is a fragmentary view of the parachute and its supporting means and illustrating the valve of Fig. 8 in its open position;

Fig. 11 is a detailed view of a foot treadle control for a main wing controlling clutch, a portion of the base of said foot treadle pedal control being broken away and illustrated in section.

Referring to the drawings in detail, numeral 1 designates the fuselage of an airplane having the main laterally extending wings 2 at opposite sides adjacent the lower forward portion thereof rearwardly of the motor 3 which has the propeller 4. The forwardly located landing gear 5 may be of the usual construction and is secured to the fuselage in the conventional way as is also the tail wheel and its support 6 although it is to be noted that the latter is located further forwardly than is customary for reasons that will become apparent as the description proceeds.

As best illustrated in Figs. 1 and 2, I provide smaller wings or ailerons 7 which are disposed above the main wings 2 and have their inner forward end portions horizontally pivoted as at 8 to the fuselage 1. The ailerons 7 are adapted to be actuated about their horizontal pivots 8 and function as usual as an element of the means for directing and controlling the flight of the craft.

The ailerons 7 are each adapted to be independently actuated by hand levers 9 operating through forwardly extending links 12 pivoted as at 12a to the depending arms of aileron-carried cranks 7a as best shown in Fig. 2.

The hand levers 9 are pivoted as at 9b intermediate their ends to opposite side walls of the cockpit 10 adjacent the backless stool-like pilot seat 11 (see Figs. 5 and 6). Pivotal connection between the links 12 and the hand levers 9 is made below the mounting pivots 9b thereof as shown in Fig. 2. There is associated with each lever 9 the usual toothed quadrant-incorporating means 9a for retaining said aileron operating levers 9 in various set positions so that it is not necessary for the operator to keep his hands on said levers.

As in my prior patent, earlier mentioned herein, it is contemplated using the main wings 2 as brakes for the purpose of enabling the plane to be brought quickly to a stop after it has landed. In carrying out this phase of the invention, it will be noted from an inspection of Fig. 2, that said wings are pivoted as at 13 to the fuselage adjacent their forward edges and having rising therefrom the curved rack-bars 15. These rack-bars 15 may be secured to the main wings 2 in any preferred manner, but I have illustrated them as having right angularly shaped bracket plates 15a. Rivets or other securing means 16 serve to attach bracket plates 15a to the wing structure.

The rack-bars 15 are curved in the arc of a circle so that the toothed portions thereof are all the same radial distance from the pivots 13 of the main wings 2.

Fig. 3 illustrates the rack-bars 15 as slidably received in channel-like guides 17 which are secured to opposite sides of the fuselage 1.

To the end that the main wings 2 may have firm support against the fuselage 1, I preferably provide the latter with under surface recesses 14 shaped to conform to the upper surface of wings 2 and to receive and sustain the same when the plane is in flight.

The means for actuating the main wings 2 downwardly as suggested in dotted lines in Fig. 2, so that they may act as a brake; and for returning them to the full line position of Fig. 2, will now be described. This means comprises pinions 18 keyed to a transverse shaft 19 which is suitably journalled in bearings carried by the fuselage 1 at a point forwardly of the cockpit 10. The pinions 18 mesh with the teeth of the respective rack bars 15 as illustrated in Figs. 1 and 2.

Pinion shaft 19 is adapted to be actuated by the constantly meshing bevel gear driving connection 20 between said shaft 19 and the lower end of a short vertical shaft 21. This short vertical shaft 21 has at its upper end a bevel gear 22 adapted to be driven in reverse directions by one of the opposed bevel gears 23a which are disposed on opposite sides of bevel gear 22 and are fast on the clutch sleeve 23. The clutch sleeve 23 is slidably keyed on the rearwardly extending shaft 24 which may be the crank shaft of the engine 3 but can, of course, be any other engine driven shaft.

The means for maintaining the clutch 23, 23a in neutral position and for actuating the same to bring one or the other of the bevel gears 23a into mesh with the short shaft bevel gear 22 includes lever 25 mounted on a subjacent, rearwardly disposed transverse shaft 26 and having its forked upper end engaging in a circumferential groove 23b at the rear end of the clutch sleeve 23, as shown in Fig. 2. Foot-rests 27 fast adjacent opposite ends of the lever shaft 26 provide the means for rocking the same. As shown in Fig. 11, the floor-carried bearing mounts 26a for shaft 26 provide spring actuated latch elements 28 adapted to engage in a selected one of a series of recesses 27b in the surface of the arcuate shaft-embracing portions 27a of foot-rests 27. Thus, the clutch sleeve 23, 23a may be retained "in neutral" or shifted to effect either downward or upward movement of main wings 2 according to which one of bevel gears 23a is in driving engagement with the short shaft bevel gear 22 (Fig. 2).

As best shown in Fig. 1, the plane terminates in a box-like tail 30 having flat top, bottom and sides and provided with a chamber 30b opening from the rear end in a tapered valve seat 30a. The chamber 30b is adapted to house a parachute 29 having the lanyards 29a connected thereto at one end, as usual, and having their opposite ends connected adjacent the margin of a disc 31 as best illustrated in Fig. 9. The disc 31 is diametrically smaller than the valve seat 30a at the rear end of the box-tail 30 so as to pass through same from the Fig. 9 position to that illustrated in Figs. 2 and 3. A flexible cable 29b serves to connect the parachute 29 to the fuselage 1, this cable having a relatively stiff portion 29c slidable in the medial bearing 31a of the disc 31 and carrying the stop or abutment 39 which is adapted to engage the outer end of the disc bearing 31 to limit inward movement of cable portion 29c. The cable portion 29c is adapted to operate a parachute valve which will be referred to hereinafter.

The cable 29b leads from the bearing 31a to a pulley 32 which is secured to the rear wall 34 of the cockpit 10. From the pulley 32 the cable 29b leads laterally, as illustrated in Fig. 3, and is passed around a second pulley 33 also carried by the rear cockpit wall 34. From the pulley 33, the cable 29b leads forwardly through the rear cockpit wall 34 and is wound upon a reel 35 journalled in a suitable bearing secured to the side wall of the cockpit 10, adjacent the pilot's seat 11. From the foregoing, it will be evident that the parachute can be readily reeled in and housed in the box-tail chamber 30b, there being provided a valve means for permitting the escape of air from the parachute as it is being reeled in.

When it is desired to effect the ejection of the parachute 29 from its housing chamber 30b, the pilot releases the reel 35 and opens a valve 29x in the fuselage which admits air into the parachute chamber so as to force the parachute 29 out to the Fig. 9 position.

The valve for effecting the release of air from the parachute 29 when it is to be reeled in will now be described. The cable 29b, 29c, heretofore referred to, effects the operation of the parachute valve and as illustrated in Fig. 9, said cable portion 29c extends through a central bearing 36a in a web which has the rearwardly arched arms 36. The outer ends of web arms 36 carry the annulus 37 whose inner surface portion forms a seat for a valve 38 which is illustrated as comprising a segment of a sphere and has the rear dome-like portion 38a to which the valve actuating cable 29c is secured at 38b. As will be apparent, when the cable 29b is reeled in, the relatively stiff extension cable 29c will be pulled inwardly until the abutment 39 engages the medial disc bearing 31a by which time the rear end of the dome portion 38a of valve 38 will have engaged the bearing 36c of the web portion or housing frame 36 of the valve (see Fig. 10). With the valve unseated, air is permitted to escape from the parachute as indicated by the arrows in Fig. 10.

As will be appreciated, the parachute 10 functions primarily as a brake but it may also be availed of as a means for effecting an emergency landing in case the plane should become disabled, as for instance, by the loss of a wing. Also, if the airplane power plant is functioning at least to some extent and the wings are intact, the said wings 2 can be bodily adjusted about their horizontal pivots 13 (see Fig. 3) to counteract the effect of the parachute which would normally be to nose the plane toward the ground. Obviously, ailerons such as 7 in Fig. 1 would not have enough surface area to accomplish the function mentioned at slow speed.

Coming now to the novel means employed for steering the plane, it will be noted that the four-sided box-tail 30 is provided with the steering flaps 40, 41, 42 and 43, which are stiff panel-like construction and pivoted as at 44 to the top, bottom, left and right sides, respectively, of the box-tail. Each of the flaps 40, 41, 42 and 43, has secured to its inner surface adjacent the rear end and intermediate the side edges a rearwardly extending bracket arm. These bracket arms are designated by reference characters 40a, 41a, 42a and 43a, respectively. Actuating cables for the respective steering flaps are designated as at 40b, 41b, 42b and 43b, respectively, and are reverted about pulleys 45 attached to the endless interior shoulder 45a of the box-tail, the ends of said cables being attached to the respective bracket arms of the steering flaps. The steering flap actuating cables 40b, 41b, 42b and 43b, extend rearwardly adjacent the inner surfaces of the fuselage wall and are passed about pulleys 40x, 41x, 42x and 43x respectively, which are secured to the floor of the cockpit 10 outwardly of the respective actuating panels, 40c, 41c, 42c, and 43c, which are arranged at the rear, front, left and right sides, respectively, of the pilot's seat 11. As best shown in Fig. 4, the steering flap-actuating cables are secured to depending tongues 50 of said flap-actuating panels.

The flap actuating panels 40c, 41c, 42c and 43c, have adjacent their lower ends the rearwardly turned ears 46 which have the pivot connections 47, with the similar contiguous ears 48, which are carried by cylinder posts 49 mounted on the floor of the cockpit 10.

In the case of the top panel 40, Fig. 4 illustrates an appropriate supplementary pulley 40' adjacent the top of the fuselage and carried by the rear wall of the cockpit 10. The operating cable 40b of this top panel is led downwardly from the pulley 40 and is passed about a pulley 40'' likewise carried by the rear cockpit wall 34 and from this pulley 40'' said actuating cable leads to the cockpit floor carried pulley 40x, previously referred to. As will be appreciated, the supplementary pulleys 40'', 40'' are necessary to dispose the top panel actuating cable 40b in its appropriate position adjacent the top of the fuselage, as indicated in Fig. 2.

Particular attention is directed to the steering flap actuating panels 40c, 41c, 42c and 43c, it being noted that the upper portions of same are inclined inwardly so as to be adapted to be engaged by the body of the pilot when he leans forward, backward or sideways. In this way, the pilot is enabled to selectively operate the appropriate steering panels 40, 41, 42 and 43. For instance, when he leans forward to engage the panel 41c, the bottom steering flap is operated outwardly to cause the plane to nose downwardly. When he leans rearwardly to force the panel 40c outwardly, the top steering flap 40 will be raised causing the plane to take an upward course. A leaning against the left panel 42c will, it will be seen, swing the left panel 42 outwardly to effect a left turn, and it follows that when the panel 43c is leaned against by the pilot, the right steering panel will be thrown outwardly causing the plane to go into a right turn.

Figs. 5 and 6 illustrate that the lower halves of the steering flap actuating panels 40c, 41c, 42c and 43c, are inclined inwardly. This is important because it enables me to provide for simultaneous operation of the steering flap operating panels. In carrying out this phase of the invention, I provide a rectangular panel actuating frame 51 having the corner rods 52 slidably working in the cylinder posts 49. Each corner rod 52 has within its cylinder post 49 a fixed shoulder 53 which acts as a stop for a coil spring 54 whose function is to normally actuate the panel operating frame 51 upwardly to the dotted line position of Fig. 7. It is evident from Fig. 3 that the panel actuating frame 51 encloses the pilot's seat 11 and Figs. 4, 5 and 6 disclose said panel actuating frame as having handles 55 at opposite sides. When the pilot desires to actuate all of the steering flaps 40, 41, 42 and 43 outwardly, as in Fig. 1, for the purpose of slowing the plane down in flight, he simply grasps the handles 55 as indicated in Fig. 6, and presses said frame 51 downwardly causing it to simultaneously engage the inwardly inclined portions of the steering flap operating panel 40c, 41c, 42c and 43c. This throws all of said panels outwardly bringing the steering flaps 41, 41, 42 and 43, to the Fig. 1 position. When the panel actuating frame 51 is permitted to rise again under the action of the coil springs 54, the steering flaps 40, 41, 42 and 43, resume their normal position which is in flat contact with the proximate surfaces of the boxtail 30 as shown in Figs. 2 and 3.

The flap-operating panels 42c and 43c each have holes 56 (see Fig. 4) adapted to receive hooks 57 (see Figs. 4 and 7) carried by handles 55 so that operating frame 51 can be held depressed to retain the tail flaps 40, 41, 42 and 43 in outwardly thrown braking position.

It is, of course, to be understood that the main wings 2, when shifted, as suggested in dotted lines in Fig. 2, serve in a sense as direction controlling and/or steering elements in addition to functioning as a brake.

Latches 58 carried by the curved rack bar guides 17 and engaging between teeth of said bars serve to lock same in either the Fig. 2 position or in vertical, braking position.

As intimated in the introductory portion of this specification, an important feature of the invention is the cooperative functioning of the main wings 2 as brakes and also to counteract the effect of the braking parachute 29 which in operative position would normally tend to nose the plane downwardly out of horizontal flight. There might also be instances when the braking parachute would be caught in the air currents to throw it downwardly which would, of course, bring about reverse action as to the fuselage nose. Manipulation of panels 40, 41 will serve, as indicated, to counteract this action. Similarly, operation of the steering side panels 42, 43 of the tail 30 enable the pilot to quickly change direction to the right or to the left to "refill" the parachute 29 in case it should be partially collapsed by a cross current or gust of air. The panels 40–43, inclusive, therefore perform an important function in connection with the parachute 29 by enabling the pilot to counteract the action of gusts of air partially collapsing the parachute 29.

Furthermore, also as earlier mentioned herein, the steering and braking panels 41, 42, 40, 43 not only enable the pilot to steer the plane while in normal flight but also enable him to steer the plane while the braking parachute 29 is in operative position, as shown in Fig. 1. These panels also provide what must be termed an "amidships" brake; and panel 40 can be availed of for maintaining the plane in horizontal flight against the normal "nosing down" action of the braking parachute 29 when it is not desired to use the main wings 2 for braking purposes as suggested in Fig. 2. The pilot, therefore, has two means for maintaining the ship in horizontal flight when the braking parachute 29 is in the operative position shown in Fig. 1, namely, the adjustable wings 2 and the panels 40, 41, inclusive.

While I have illustrated and described one form of the invention as required by the patent statutes, it will be obvious that my inventive concept is susceptible of various other mechanical expressions within the spirit and scope of the subject matter claimed.

Having thus described my invention, what I claim is:

1. In an airplane, a fuselage having nose and tail portions, laterally extending sustaining wings carried by the fuselage adjacent the nose portion, means for connecting said wings to the fuselage for movement about a horizontal pivot whereby said wings may serve as brakes, a releasable braking parachute carried in the tail portion of the fuselage, a flexible connection carried by said parachute and secured to the fuselage through the tail portion, and pilot-operable adjusting means operatively connected to said wings to adjust them vertically about said horizontal pivot to counteract the tendency of the braking parachute to throw the ship out of horizontal flight when said parachute is in operative position.

2. In an airplane, a fuselage having nose and tail portions, laterally extending sustaining wings carried by the fuselage adjacent the nose portion, means for connecting said wings to the fuselage for movement about a horizontal pivot whereby said wings may serve as brakes, a releasable braking parachute carried in the tail portion of the fuselage, a flexible connection carried by said parachute and secured to the fuselage through the tail portion, pilot-operable adjusting means operatively connected to said wings to adjust them vertically about said horizontal pivot to counteract the tendency of the braking parachute to throw the ship out of horizontal flight when said parachute is in operative position, and combined steering and braking panels pivoted transversely to the sides, top and bottom of said tail portion well inwardly of the rear end thereof, and pilot-operated control means for said panels.

3. In an airplane, a fuselage having a tail portion providing an open ended parachute-receiving chamber, a braking parachute adapted for storage in said chamber, means for anchoring said parachute to said fuselage, combined steering and braking panel-like flaps transversely pivoted to the top, bottom and sides of said rectangular tail portion, pilot-operated control means for said flaps, said fuselage providing an air catching inlet to said parachute-receiving chamber whereby to effect expulsion of the parachute therefrom when the airplane is in flight, a pilot-controlled valve for said air inlet, laterally extending wings projecting from opposite sides of the fuselage adjacent the forward end thereof, means supporting said wings for movement about a horizontal axis whereby said wings may be operated to serve as brakes and also to counteract any tendency of the braking parachute to throw the plane out of horizontal flight when the parachute is in operative position, and pilot-operated adjusting means operatively connected to said wings for adjusting the same to different positions about said horizontal axis.

4. In an airplane, a fuselage having a tail portion providing an open ended parachute-receiving chamber, a braking parachute adapted for storage in said chamber, means for anchoring said parachute to said fuselage, said parachute anchoring means comprising a cable, a fuselage-carried reel on which said cable is wound, said parachute having a medial vent opening, and a cable controlled closure valve for said vent opening and having a marginal flange and said flange actuated by said cable to a position against and closing said open chamber end when the parachute is housed in said chamber.

5. In an airplane, a fuselage having a tail portion providing an open ended parachute-receiving chamber, a braking and airplane-crash-preventing parachute adapted for storage in said chamber, means for anchoring said parachute to said fuselage, said parachute anchoring means comprising a cable, a fuselage-carried reel on which said cable is wound, said parachute having a medial vent opening, and a cable controlled closure valve for said vent opening and having a marginal flange, and said flange actuated by said cable to a position against and closing said open chamber end when the parachute is housed in said chamber, fuselage sustaining wings extending from opposite sides thereof adjacent the forward end, and means horizontally pivoting said wings for vertical movement and pilot-operated means controlling said wings whereby they may be employed as brakes and also to counteract any effect of the braking parachute in tending to throw the ship out of horizontal flight.

6. In an airplane, a fuselage having a tail portion providing an open ended parachute-receiving chamber, a braking parachute adapted for storage in said chamber, means for anchoring said parachute to said fuselage, and comprising a cable, a winding drum on which the inner end of said cable is wound, a plunger rod secured to the outer end of said cable, a vent valve in the medial portion of said parachute and connected to the outer end of said rod, circumferentially spaced cords secured to the marginal portion of said parachute, a disk slidable on said rod and carrying the inner ends of said cords, and a stop fast on said rod outwardly of said disk and engageable with same after the vent is opened to effect withdrawal of the parachute into said tail chamber as the cable is reeled in.

7. In an airplane, a fuselage providing a forward cockpit and a tail, a releasable braking parachute in said tail, and connected to the fuselage through same, main supporting wings horizontally pivoted to said fuselage at their forward edges adjacent the cockpit, pilot-operable actuating means operatively connected to said main wings and operable to actuate said wings substantially to vertical and intermediate vertically inclined positions for braking and directional control purposes and to counteract the tendency of the braking parachute to throw the nose downwardly when said parachute is in operative position.

8. In an airplane, a fuselage providing a forward cockpit and a tail, main supporting wings horizontally pivoted to said fuselage at their forward edges, pilot-operated actuating means operatively connected to said main wings and operable to actuate said wings substantially to vertical position for braking and directional control purposes, outwardly movable steering and braking panel-like flaps carried by said tail at at least two opposite sides thereof, independent pilot-operated means for selectively operating said flaps, and a releasable parachute-like member secured to said fuselage and housed in said tail, the latter being open at its end, and a closure for the open end of said tail and provided by said parachute-like member.

9. The combination set forth in claim 6, and a seat-providing plate incorporated in said vent valve and said plate moving to a position against and closing the open end of the parachute-receiving chamber when the parachute has been pulled thereinto.

CHALMERS LAMAR WEAVER.

REFERENCES CITED

The following references are of record in the file of this patent:

UNITED STATES PATENTS

| Number | Name | Date |
| --- | --- | --- |
| 1,368,548 | Curtiss | Feb. 15, 1921 |
| 1,383,124 | Jordan | June 28, 1921 |
| 1,477,163 | Barton | Dec. 11, 1923 |
| 1,769,161 | O'Donnell | July 1, 1930 |
| 1,914,448 | Murray | June 20, 1933 |
| 1,972,967 | Zahodiakin | Sept. 11, 1934 |
| 2,347,230 | Zuck | Apr. 25, 1944 |